(12) United States Patent
Nguyen

(10) Patent No.: US 7,146,521 B1
(45) Date of Patent: Dec. 5, 2006

(54) PREVENTING DAMAGE OF STORAGE DEVICES AND DATA LOSS IN A DATA STORAGE SYSTEM

(75) Inventor: Tom Nguyen, San Jose, CA (US)

(73) Assignee: 3PARdata, Inc., Fremont, CA (US)

( * ) Notice: Subject to any disclaimer, the term of this patent is extended or adjusted under 35 U.S.C. 154(b) by 540 days.

(21) Appl. No.: 10/226,823

(22) Filed: Aug. 21, 2002

(51) Int. Cl.
*G06F 11/00* (2006.01)
(52) U.S. Cl. .............. 714/2; 714/1; 714/25; 702/130; 718/105
(58) Field of Classification Search ............ 714/1, 714/2, 25; 702/130; 718/105
See application file for complete search history.

(56) References Cited

U.S. PATENT DOCUMENTS

| | | | | |
|---|---|---|---|---|
| 5,115,225 A * | 5/1992 | Dao et al. | ............... | 340/584 |
| 5,623,594 A * | 4/1997 | Swamy | ............... | 714/1 |
| 5,732,215 A * | 3/1998 | Boutaghou et al. | ............... | 710/74 |
| 6,301,105 B1 * | 10/2001 | Glorioso et al. | ............... | 361/685 |
| 6,338,150 B1 * | 1/2002 | Johnson et al. | ............... | 714/39 |

\* cited by examiner

*Primary Examiner*—Robert Beausoliel
*Assistant Examiner*—Emerson Puente
(74) *Attorney, Agent, or Firm*—Patent Law Group LLP

(57) ABSTRACT

A data storage system and method capable of reducing the operating temperature of the data storage system, removing any overheating storage devices from operation, reconstructing data, and evacuating data from the overheating storage devices before the devices and the data are damaged or lost.

17 Claims, 4 Drawing Sheets

PREVENTING DAMAGE OF STORAGE DEVICES AND DATA LOSS IN A DATA STORAGE SYSTEM

BACKGROUND OF THE INVENTION

1. Field of the Invention

The present invention relates generally to the field of data storage and, more particularly, to continuous uninterrupted access of the components of a data storage system.

2. Related Art

In the context of computer systems, enterprise storage architectures provide mass electronic storage of large amounts of data and information. The frenetic pace of technological advances in computing and networking infrastructure—combined with the rapid, large-scale sociological changes in the way the way these technologies are used—has driven the transformation of enterprise storage architectures faster than perhaps any other aspect of computer systems. This has resulted in a variety of different storage architectures, such as, for example, direct attached JBODs (Just a Bunch Of Disks), SAN (Storage Area Network) attached JBODs, host adapter RAID (Redundant Array of Inexpensive/Independent Disks) controllers, external RAID controllers, redundant external RAID controllers, and NAS (Network Attached Storage).

Enterprise architectures may utilize disk storage systems to provide relatively inexpensive, non-volatile storage. Disk storage systems have a number of problems. These problems include the following. Disk systems are prone to failure due to their mechanical nature and the inherent wear-and-tear associated with operation. Any number of components or devices may fail within a distributed storage system. Aside from the drives themselves, all of the other electrical circuits and network components may fail.

A failure of a crucial component in some storage systems, especially a network component or circuit, may shut down the entire system or result in lost data. Even minor failures may have disastrous results if not quickly addressed.

SUMMARY OF THE INVENTION

The present invention provides for a more robust and easily maintainable data storage system. Overheating storage devices within the data storage system are detected, cooled, and removed from data transfer operations, and the data is evacuated to properly functioning components. Therefore, loss of data is avoided. Furthermore, when a problem is detected in a component, it can be placed offline before the problem is exacerbated with repeated data storage operations, perhaps extending the life of the component and of the entire system. In addition to the tremendous benefit of uninterrupted data storage with minimized risk of lost data, the serviceabilty of the data storage system is increased. Instead of having to replace a malfunctioning part immediately, the part may be taken offline, and may be serviced during a periodic inspection at a later, more convenient date when other servicing of the system is scheduled, and when other malfunctioning components may be simultaneously attended to.

Other aspects and advantages of the present invention will become apparent from the following descriptions and accompanying drawings.

BRIEF DESCRIPTION OF THE FIGURES

For a more complete understanding of the present invention and for further features and advantages, reference is now made to the following description taken in conjunction with the accompanying drawings, in which.

DETAILED DESCRIPTION

Various modifications or adaptations of the methods and or specific structures of the embodiments described may become apparent to those skilled in the art. All such modifications, adaptations, or variations that rely upon the teachings of the present invention, and through which these teachings have advanced the art, are considered to be within the scope of the present invention. Hence, these descriptions and drawings are not to be considered in a limiting sense, as it is understood that the present invention is in no way limited to the embodiments illustrated.

Environment for a Data Storage System

Figure 1:
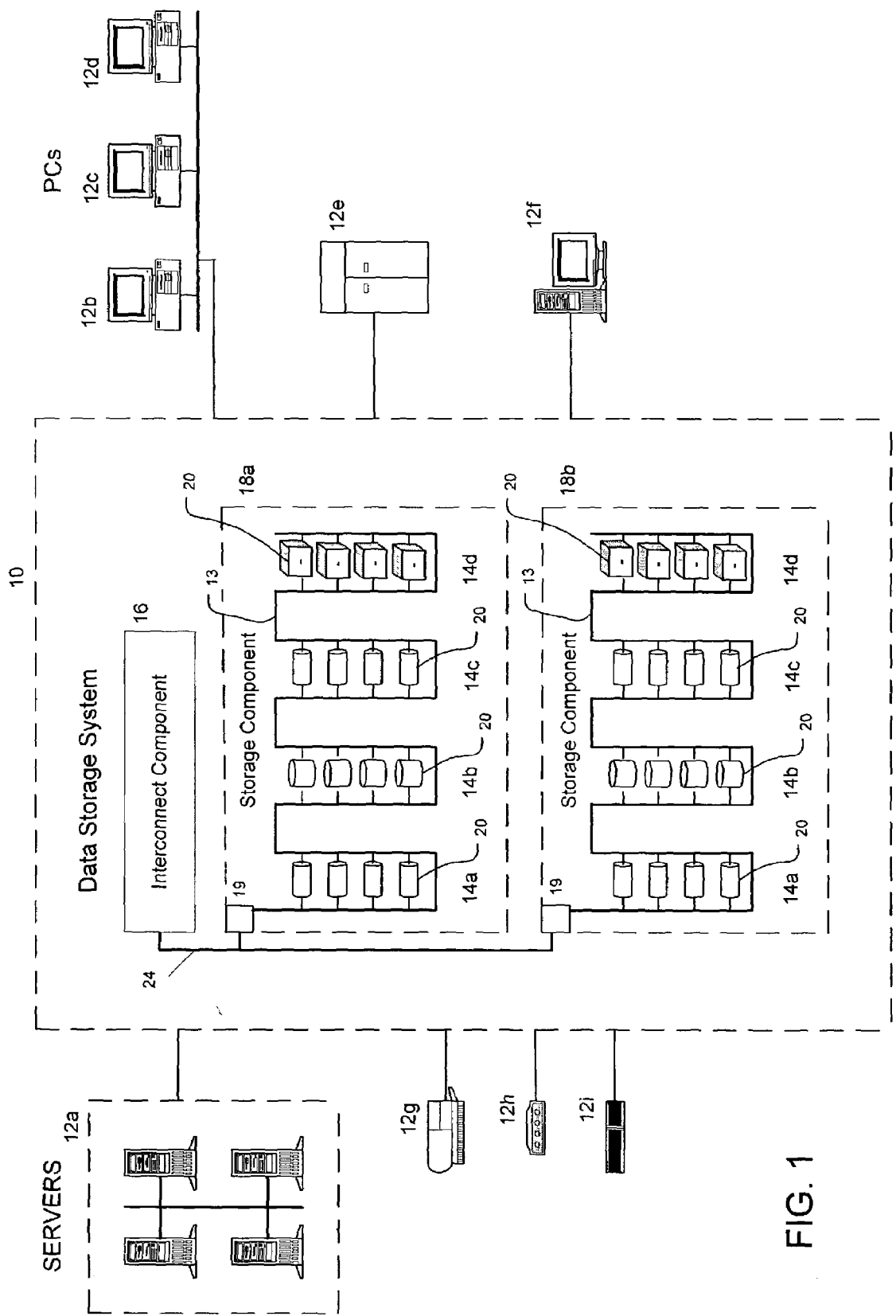
FIG. 1 illustrates an environment in which a data storage system according to an embodiment of the present invention may operate.

FIG. 1 illustrates an environment in which a data storage system 10 according to an embodiment of the present invention may operate. In general, data storage system 10 functions to provide mass storage for data and information routed, generated, manipulated, processed, or otherwise operated upon, by various host devices 12.

As depicted, these host devices 12 can include various processing devices, such as, for example, a server cluster 12a, one or more personal computers 12b, 12c, and 12d, a mainframe 12e, and a server tower 12f. Host devices 12 may also include various peripheral devices, such as, for example, a printer 12g, a modem 12h, and a router 12i. Each of these host devices 12 is connected to data storage system 10. As used herein, the terms "connected" or "coupled" mean any connection or coupling, either direct or indirect, between two or more elements; such connection or coupling can be physical or logical.

Data storage system 10 includes an interconnect component 16 and one or more storage components 18. In this example, two storage components 18a and 18b are shown. Interconnect component 16 generally allows host devices 12 to store and retrieve information from storage component 18. In one embodiment, interconnect component 16 is a modular architecture that is readily scaled from one up to many computer access nodes. Each node may be associated with one or more particular storage devices in storage components 18.

Storage components 18 provide mass storage for data and information. Storage components 18 can be implemented with any suitable mass storage resource, such as tape or disk storage. In one embodiment, as shown, storage components 18 include a number of storage devices 20, (only a portion of which, for clarity, are labeled FIG. 1). In one embodiment, each storage component 18 may include a JBOD (Just a Bunch of Disks) facility comprising a plurality of disk drives. The disk drives can be mounted in one or more rack-mountable storage shelves, each of which has one or more hot-pluggable disk drive sleds 14 (separately labeled 14a, 14b, 14c, and 14d). Each sled 14 may accommodate four disk drives on a pair of fibre channel (FC) connections 13. For each storage component 18, the sleds 14 can be configured in one of two possible ways: (1) all sleds on the same redundant FC connections 13 (as shown in FIG. 1), or (2) half of the sleds 14 on one set of redundant FC connections 13 and the other half of the sleds 14 on another set of redundant FC connections 13. The storage devices on the FC connection 13 may function according to a Fiber Channel Arbitrated Loop (FCAL) specification. This may be accomplished with firmware on the JBOD facilities. This firmware is stored in flash memory read by controllers 19. The flash memory is preferably located within the controller or on the same board that houses the controller, so that it may be accessed even when FC connection 24 is down, but may be located anywhere within data storage system 10.

The storage components 18 each include a controller chip 19 connected to FC connections 13. Each of the storage components 18 may be connected in a daisy chain fashion to each of the other storage components through controller chip 19 and to interconnect component 16 with FC connection 24. The controller chip 19 manages the flow of data to and from the storage devices 20, and also serves to monitor the storage devices 20 and the other components within storage components 18 such as, but not limited to the FC connections 13 and other related circuitry within the storage components 18.

As further described herein, data storage system 10 implements or incorporates a scalable architecture particularly well suited for communication-intensive, highly available data storage, processing, or routing. This architecture may be used for a number of applications and can provide a high performance, highly available, scalable, flexible, and cost-effective storage array.

With the scalable architecture of data storage system 10, users (e.g., businesses) may begin with small configurations of data storage initially and later, when necessary, may expand to extremely large configurations. This expansion can be done without bringing down data storage system 10, changing system architectures, or drastically altering the basic infrastructure of the computing environment supported by data storage system 10. Additional storage components 18 and nodes 22 (FIG. 2) may be added at any time.

Interconnect Component

Figure 2:
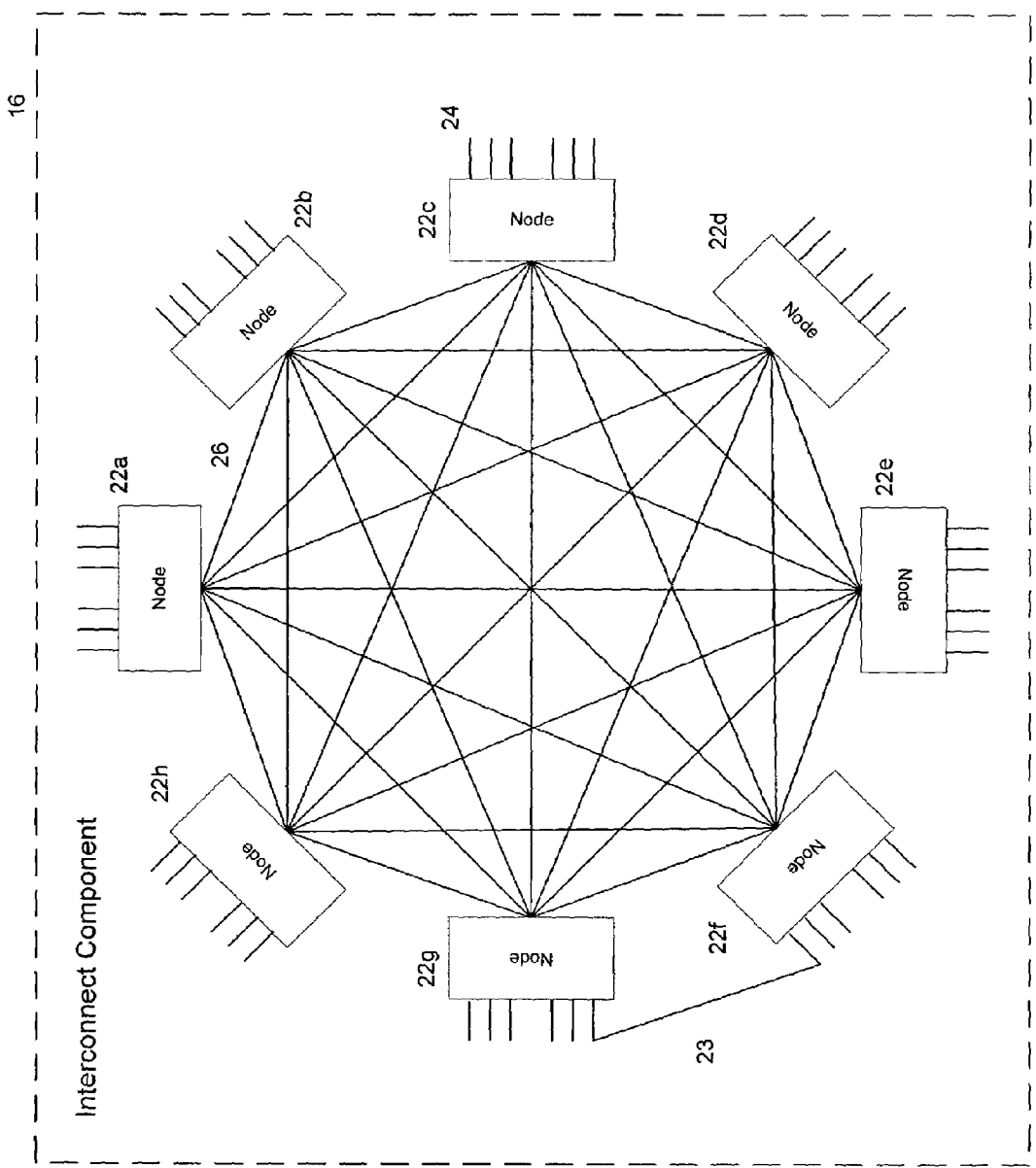
FIG. 2 is a block diagram of interconnect component 16 of FIG. 1.

FIG. 2 is a block diagram for interconnect component 16, according to an embodiment of the present invention. Interconnect component 16 may include a number of processing nodes 22 connected together by communication paths 26.

As depicted, nodes 22 are separately labeled as 22a, 22b, 22c, 22d, 22e, 22f, 22g, and 22h. Each node 22 generally functions as a point of interface/access for one or more host devices 12 and storage devices 20 (FIG. 1). For this purpose, in one embodiment, each node 22 may include one or more peripheral component interconnect (PCI) slots, each of which supports a respective connection 24. Each connection 24 can connect a host device 12 or a storage device 20. Connections 24 can be small computer system interface (SCSI), fibre channel (FC), fibre channel arbitrated loop (FCAL), Ethernet, Infiniband, or any other suitable connection. According to some embodiments, an interface component may be implemented or reside at one or more nodes 22 for facilitating the access to the various storage devices 20 which can make up data storage system 10.

In one embodiment, each host device 12 and storage device 20 has two separate connections 24 to interconnect component 16. In each such pair of connections 24, one connection 24 couples the respective host/storage device to one node 22 and the other connection 24 couples the respective host/storage device to another node 22. One of these two nodes 22 is designated as the "primary node" for the host/storage device, while the other node 22 is designated as the "secondary node." In normal operation, in one embodiment, the primary node performs all accesses to the respective host/storage device; the secondary node takes over only if the primary node fails. In an alternative embodiment, the primary node and the secondary node are simultaneously active to perform accesses. Both embodiments provide redundancy and fault tolerance so that the failure of any particular node 22 does not result in loss of connection to the host devices 12 and storage devices 20 connected to that node 22.

Each node 22 may include its own separate cluster memory (not expressly shown in FIG. 2). Each cluster memory buffers the data and information which is transferred through the respective node 22. Each cluster memory can also serve to buffer the data/information transferred through one or more other nodes 22, as described below in more detail. Thus, taken together, cluster memory in the nodes 22 is used as a cache for reads and writes into storage component 18. Cluster memory can be implemented as any suitable cache memory, for example, synchronous dynamic random access memory (SDRAM).

Communication paths 26 (only one of which is labeled for clarity) connect nodes 22 together. As shown, communication paths 26 connect any given node 22 with every other node 22 of interconnect component 16. That is, for any given two nodes 22, a separate communication path 26 is provided. Each communication path 26 may be implemented as a high-speed, bi-directional link having high bandwidth to provide rapid transfer of data and information between nodes 22. In one embodiment, the links can be two-bytes wide and operate at 266 MHz in each direction, for a total bandwidth of 1,064 MB/s per link. Control of data/information transfers over each communication path 26 is shared between the two respective nodes 22.

Node

Figure 3:
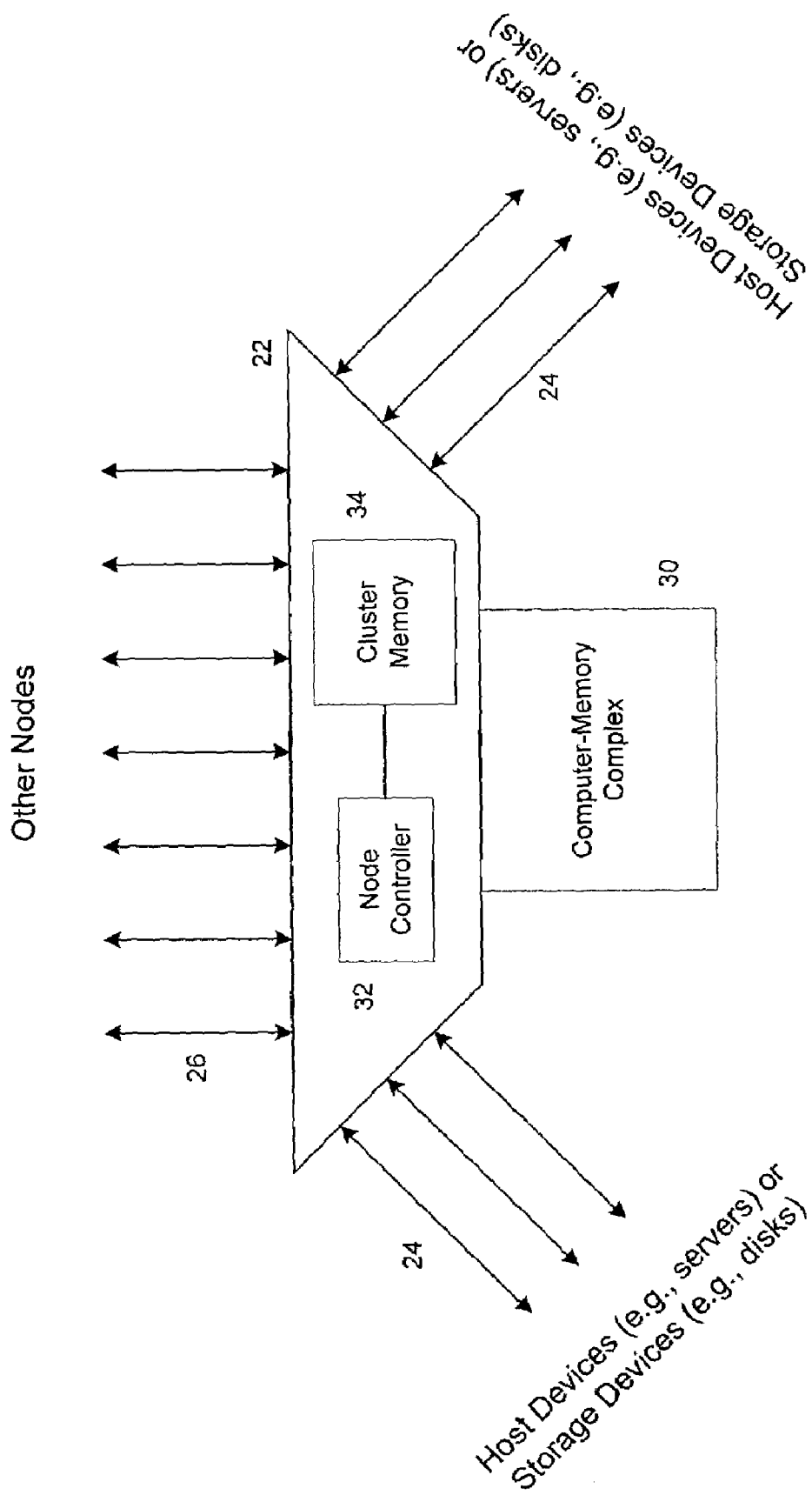
FIG. 3 is a simplified block diagram for a node 22, according to an embodiment of the present invention.

FIG. 3 is a block diagram of a node 22, according to an embodiment of the present invention. Node 22 supports connections 24 for connecting host devices 12 and storage devices 20, and communication paths 26 for communicating with other nodes 22. As depicted, node 22 can be implemented with a computer-memory complex 30, a node controller 32, and a cluster memory 34.

Computer-memory complex 30 can be a computer system which includes one or more central processing units (CPUs) and associated memory running an independent copy of an operating system. Computer-memory complex 30 functions to support, control, or otherwise manage one or more suitable buses through which data and information can be transferred via connections 24. In one embodiment, each such bus can be a peripheral component interconnect (PCI) bus. Computer-memory complex 30 may also support other functions, such as, for example, a hypertext transport protocol (HTTP) service, a network file system (NFS) service, and a common Internet file system (CIFS) service. An embodiment of computer-memory complex 30 is described below in more detail.

Node controller 32 and cluster memory 34 are distinct and separate from computer-memory complex 30. Node controller 32 may cooperate with computer-memory complex 30 but, to some degree, operates independently of the same.

That is, computer-memory complex 30 may program node controller 32. Node controller 32, as programmed, can then operate independently on data, thereby providing overall control for the transfer of data through node 22. Accordingly, computer-memory complex 30 is not burdened with the task of performing actual operations on the data. Cluster memory 34 is coupled to node controller 32 and, as described herein, generally functions to cache data and information being transferred through node 22. With cluster memory 34, data/information being transferred through node 22 does not have to be temporarily stored in computer-memory complex 30. Thus, by reducing the workload and responsibilities of computer-memory complex 30, node controller 32 and cluster memory 34 facilitate and optimize the transfer of data and information through node 22.

In one embodiment, transfers of data/information can occur directly between the cluster memories 34 on two nodes 22. The high bandwidth of communication paths 26 allows very efficient communication between nodes 22. Furthermore, these direct transfers between any two given nodes 22 can be under the control of one or both of the respective node controllers 32. Thus, such direct transfers do not consume any PCI bandwidth or CPU/memory bandwidth of any computer-memory complex 30.

This ability to let bulk data transfer bypass the general purpose computer-memory complex 30 is advantageous. It enables the transfer of data/information at tremendous bandwidth. Furthermore, because the computer-memory complex 30 complex is less loaded, it is more available to provide or support other functions, such as, for example, a HTTP service, a NFS service, and a CIFS service.

Further details for node 22 and other aspects of the data system 10 are provided in U.S. patent application Ser. No. 09/633,088 entitled "Data Storage System," and to U.S. patent application Ser. No. 09/751,649 entitled "Communication Link Protocol Optimized For Storage Architectures," which are assigned to the same Assignee hereby incorporated by this reference in their entirety.

Hotspot Management

The storage devices, and in particular, the storage drives of the JBODs are frequently requested to perform input/output (I/O) transactions. This increases the temperature of the storage devices due to mechanical movement and electrical current flow in the circuitry. In some cases, a storage device, in particular a hard drive, may overheat, or exceed its operating temperature specifications. This may result in permanent damage to the drive and data loss for the user. In addition to avoiding the catastrophic and well-known problem of data loss, the present invention also minimizes replacement expenses. As the high speed drives used in advanced data storage systems are much more expensive than ordinary drives, the cost of a replacement drive is quite expensive. Furthermore, any storage system down-time required to replace a damaged drive interrupts business, is costly, and can be avoided with the present invention. More importantly, damage to the drives can often be altogether circumvented with the present invention.

This is made possible due to the distributed nature of the processors in data storage system 10 in different levels. For example, if there was only a single level of processors, if the connection to the drives failed, it would be impossible to communicate with the drives. As discussed previously, each storage component 18, or each JBOD has a controller 19 that interacts with the processors of interconnect component 16 and the nodes 22 therein. The controller 19 can monitor the status of the storage devices 20, and remove them from data storage operations in a process referred to as spinning them down. A drive that is spun down may still be communicated with, and may also be "spun up", or back into a state of readiness for data storage operations, whether it is in or out of its operating specifications. If it cools down, or otherwise returns to being within specifications, the drive will be returned to service in data storage operations. Generally, a drive that is found to be out of operating specifications will only be spun up while still in that state in order to transfer the data it contains to a drive that is operating within specifications. However, there may be other situations that require a drive that is out of operating specifications to take part in data storage operations.

The operating specifications for the myriad of drives available on the market vary widely. The operating specifications or parameters that follow are given only to illustrate the functioning of the data storage system and hotspot management operations. Therefore, the following parameters are only examples should not limit the scope of the invention. If the maximum operating temperature of a drive for continuous data storage operations is determined to be 60 degrees Celsius (C), then any drive operating above that temperature will be deemed by data storage system 10 to be in a severe state. Any drive operating above 50 C, but below 60 C will be deemed to be in an alarm state. The alarm state should be a flexible number, adjustable within a range of about 5–15 C below the maximum operating temperature for continuous data storage operations, although a ten degree difference between the severe state and the alarm state is preferable. Thus, the preferred threshold for the alarm state in the preferred embodiment is about 50 C. Normal state is then roughly 45 C, or any temperature below the alarm state (50 C). These states and the corresponding temperatures can be determined from the manufacturers specifications or from experimental data and experience.

Figure 4:
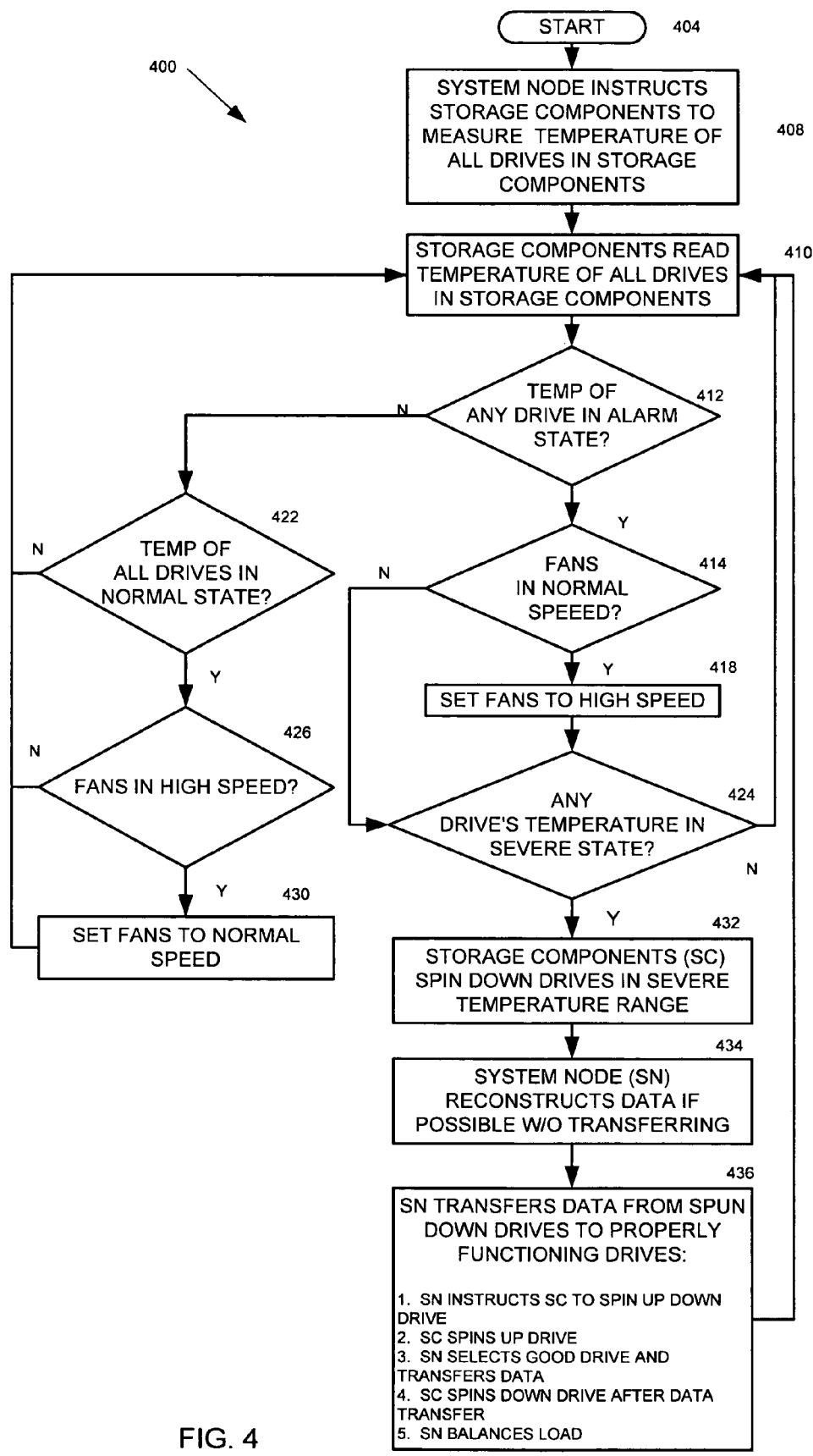
FIG. 4 is a flowchart of the data recovery and hotspot management process.

FIG. 4 is a flowchart describing the overall hot-spot management process 400. Process 400 is initiated upon startup of data storage system ("DSS") 10 in step 404, or may be initiated at any other phase of operation of DSS 10.

In step 408, a system node 22 instructs one or all of storage components 18 to measure the temperature of selected storage devices (in this case drives) 20. Although the process will be discussed in relation to storage drives, it may also be used with other types of storage devices within DSS 10. Each drive has an internal temperature sensor that can communicate its temperatures over fibre channel connections 13. In step 410, the storage components 18 measure the temperature of the storage drives 20 through the use of storage component controllers 19. This is done for each storage component 18 and each drive 20. After that, each storage component 18 determines if any drive is in an alarm state in step 412.

If no drive is in an alarm state, the system will then analyze if all selected drives are in a normal state in step 422, i.e. it will check to see if all drives are operating below 50 C. If not, the system will simply keep checking from time to time by returning to step 410. If all drives of a particular storage component are in a normal state, the system will then check to see if the fans of that storage component are set to high speed. If so, the fans will then be set to "normal" speed in step 430, and then the process will return to step 410. If not, the process will simply return to step 410 and continue. The low speed is the default speed and should be sufficient for normal operations, thus the low speed is deemed the "normal speed." This is done for all storage components 18.

If any of the storage devices are in an alarm state, each storage component checks to see if the fans are set at a low or "normal" speed in step 414. If the fans are not set in normal speed, step 414 is followed by step 424. If the fans are in normal speed the fans are then set to high speed by storage component controllers 19 in step 418. Each sled has two fans that can be independently adjusted. The fan speeds may be gradually varied according to one embodiment of the present invention, or may, as in the preferred embodiment have two discrete speeds: normal (low) and high. The design of sleds 14, the enclosures, and the fans therein are discussed in greater detail in U.S. patent application Ser. No. 09/990,118, filed Nov. 21, 2001 and entitled "Enclosure for Removable Electronic Devices," and 09/990,121, filed Nov. 21, 2001 and entitled "Enclosure Having a Divider Wall for Removable Electronic Devices," assigned to the assignee of the present application, which are hereby incorporated by this reference in their entirety. The fans of each storage component or JBOD are part of the JBOD and independent of any fans that may be located inside any of the individual hard drives. Additionally, controller 19 of each of the JBODs is also different than any controller that may be part of the hard drives. Thus, the cooling of the JBODs is in addition to any cooling mechanisms that may be present within each hard drive, if any such mechanisms are present.

In step 424, the storage components 18 check to see if any drive is in a severe state. If this is not the case, the process will return to step 410. If, however, any drives are found to be in a severe state, the storage components where the particular (severe state) drives are located will spin down the drives in step 432. In step 434, the system nodes 22 will attempt to reconstruct the data residing on the spun down drive(s). As the data was striped or redundantly stored according to a redundant protocol such as the RAID-1 or RAID-5 protocol when it was originally stored, it can be reconstructed from the other drives involved in the striping or the redundant storage according to the protocol. Note that in some embodiments the data may be reconstructed even before the drives are spun down in step 432. If the data cannot be reconstructed for some reason, it may be transferred in step 436. Alternatively, the data may be reconstructed in step 434 and evacuated in step 436 in order to provide two levels of data protection.

In step 436, the system nodes 22 will move the data residing on the down drives to properly functioning drives. This involves the system nodes 22 instructing each storage component 18 having a down drive 20 to spin-up the down drive(s) 20. Each storage component 18 then spins up the down drive(s) and the system nodes 22 select a good drive from all of the storage components 18, and transfers the data to the selected drive. In one embodiment load balancing procedures may be implemented at the interconnect component level. In other words, the interconnect component 16 and the nodes 22 therein may likewise allocate data transfer between various storage components 18a, 18b, through 18x depending on the remaining capacity of the components and the data transfer rates to the components. In one embodiment, data storage operations are in accordance with the RAID-1 or RAID-5 protocol, and therefore load balancing takes the parameters of these protocols into account.

Load balancing is done through the use of virtual volumes. Virtual volumes are representations of data storage. The virtual volumes are an abstraction of physical disks or storage drives 20 and are used to distribute data among the physical disks. Storage drives 20 are logically divided into pieces called "chunklets" Storage drives 20 comprise multiple chunklets organized into groups. A virtual volume manager ("VVM") is located in interface component 16 and the nodes 22. The VVM generally functions to configure, set-up, and otherwise manage virtual volumes of data in storage drives 20. The VVM maps blocks (or regions) of the virtual volumes onto blocks on storage drives 20. The mapping can be used to cache selected blocks of a virtual volume, and place regions of the virtual volume that have been evacuated from an overheating drive onto a properly functioning drive. The virtual volume implements a redundancy scheme that activates redundant replacement storage in the event of disk failure. The redundant schemes may be any well known schemes, but as mentioned previously, are in accordance with the RAID-1 and/or RAID-5 protocol.

While embodiments of the present invention have been shown and described, changes and modifications to these illustrative embodiments can be made without departing from the present invention in its broader aspects. Thus, it should be evident that there are other embodiments of this invention which, while not expressly described above, are within the scope of the present invention and therefore that the scope of the invention is not limited merely to the illustrative embodiments presented. Therefore, it will be understood that the appended claims set out the metes and bounds of the invention. However, as words are an imperfect way of describing the scope of the invention, it should also be understood that equivalent structures and methods while not within the express words of the claims are also within the true scope of the invention.

The invention claimed is:

1. A data storage system, comprising:
   an interconnect component including one or more processors;
   a group of storage components, each storage component comprising a controller, one or more fans, and a plurality of disk drives;
   wherein the controller of each storage component is operable to:
     increase a fan speed if the controller detects a temperature of an overheating disk drive over a first threshold;
     remove the overheating disk drive from data storage operations if the controller detects the temperature of the overheating disk drive over a second threshold after the fan speed is increased, wherein the second threshold is greater than the first threshold; and
     temporarily activating the overheating drive so that data can be evacuated from the overheating disk drive to one or more properly functioning disk drives; and
   wherein the interconnect component is operable to transfer data from the overheating disk drive to the one or more properly functioning disk drives.

2. The data storage system of claim 1, wherein the one or more processors are operable to allocate data transfer between the one or more properly functioning disk drives.

3. The data storage system of claim 2, wherein the interconnect component is operable to reconstruct any data stored on the overheating disk drive prior to transferring the data from the overheating disk drive.

4. The data storage system of claim 3, wherein the data stored on the overheating disk drive is reconstructed according to a RAID-1 or RAID-5 protocol.

5. The data storage system of claim 2, wherein the interconnect component balances a load between the storage components by allocating data transfer between the storage components.

6. The data storage system of claim 5, wherein the interconnect component comprises a plurality of system nodes, and wherein the interconnect component balances the load between the system nodes.

7. The data storage system of claim 1, wherein the overheating disk drive is either in an alarm state or a severe state, and wherein the fan speed is increased when the overheating disk drive is in the alarm state.

8. The data storage system of claim 7, wherein the overheating disk drive is removed from data storage operations when it is in the severe state.

9. A method of minimizing disk drive failures and data loss in a data storage system comprising an interconnect component and one or more storage components each comprising disk drives, a fan, and a controller, the method comprising:
   detecting an overheating disk drive within a storage component with the controller;
   increasing a fan speed with the controller if the overheating disk drive is detected;
   removing the overheating disk drive from data storage operations, with the controller, if after the fan speed is increased the overheating disk drive is still overheating;
   evacuating data from the overheating disk drive by temporarily activating the overheating drive and transferring the data to another disk drive.

10. The method of claim 9, wherein when evacuating the data, the controller first activates the overheating disk drive and then the interconnect component transfers the data from the overheating disk drive to the another disk drive.

11. The method of claim 9, wherein the overheating drive is either above a first temperature level or a second temperature level, and wherein the fan speed is increased if the overheating disk drive is above the first temperature level.

12. The method of claim 11, wherein the overheating disk drive is removed from data storage operations if the overheating disk drive is above the second temperature level.

13. The method of claim 12, wherein the first temperature level ranges from about five to ten degrees centigrade less than the second temperature level.

14. The method of claim 11, wherein the second temperature level is about equal to or greater than the overheating disk drive's recommended operating temperature.

15. The method of claim 9, further comprising reconstructing the data.

16. The method of claim 9, wherein the another disk drive is located within the same storage component as the overheating disk drive.

17. The method of claim 9, wherein the overheating disk drive is located in a first storage component and wherein the another disk drive is located within a second storage component.

* * * * *